United States Patent
Ng

(10) Patent No.: US 9,500,489 B1
(45) Date of Patent: Nov. 22, 2016

(54) METHOD OF ADJUSTING A NAVIGATION ROUTE BASED ON DETECTED PASSENGER SLEEP DATA AND RELATED SYSTEM

(71) Applicant: MITAC INTERNATIONAL CORP., Taoyuan (TW)

(72) Inventor: Gene Gimtong Ng, San Dimas, CA (US)

(73) Assignee: MITAC INTERNATIONAL CORP., Taoyuan (TW)

( * ) Notice: Subject to any disclaimer, the term of this patent is extended or adjusted under 35 U.S.C. 154(b) by 0 days.

(21) Appl. No.: 15/059,314

(22) Filed: Mar. 3, 2016

(51) Int. Cl.
*G01C 21/34* (2006.01)
*B60W 40/08* (2012.01)

(52) U.S. Cl.
CPC .......... *G01C 21/3461* (2013.01); *B60W 40/08* (2013.01)

(58) Field of Classification Search
CPC .......................... G01C 21/3461; B60W 40/08
USPC .......................................................... 701/36
See application file for complete search history.

(56) References Cited

U.S. PATENT DOCUMENTS

| | | | |
|---|---|---|---|
| 5,508,930 A | 4/1996 | Smith, Jr. | |
| 5,659,476 A | 8/1997 | LeFebvre | |
| 7,062,379 B2 | 6/2006 | Videtich | |
| 7,174,253 B2 | 2/2007 | Videtich | |
| 7,184,886 B1 | 2/2007 | Krull | |
| 7,945,386 B2 | 5/2011 | Lokshin | |
| 8,126,641 B2 | 2/2012 | Horvitz | |
| 8,527,198 B2 | 9/2013 | Hardy | |
| 8,606,511 B2 | 12/2013 | Johnson | |
| 8,904,308 B2 * | 12/2014 | Kramer | 715/781 |
| 9,031,784 B2 | 5/2015 | Mochizuki | |
| 9,293,042 B1 * | 3/2016 | Wasserman | G07C 5/006 |
| 9,317,742 B2 * | 4/2016 | Kramer | B60K 35/00 |
| 2008/0004794 A1 * | 1/2008 | Horvitz | G01C 21/3492 701/414 |

(Continued)

FOREIGN PATENT DOCUMENTS

| | | |
|---|---|---|
| TW | 201009302 | 3/2010 |
| TW | I336768 | 2/2011 |

(Continued)

OTHER PUBLICATIONS

Syed Anas Imtiaz, A Low Computational Cost Algorithm for REM Sleep Detection Using Single Channel EEG, Aug. 12, 2014.

(Continued)

*Primary Examiner* — McDieunel Marc
*Assistant Examiner* — James E Stroud
(74) *Attorney, Agent, or Firm* — Winston Hsu; Scott Margo

(57) ABSTRACT

A method of adjusting a navigation route based on detected passenger sleep data includes generating a predetermined route with a device installed in a vehicle, providing navigational assistance for guiding a driver to follow the predetermined route, receiving sleep indicators for a passenger traveling in the vehicle, the sleep indicators indicating whether the passenger is sleeping, calculating a sleep session duration for the passenger according to the sleep indicators, generating with the device an alternate route in response to the sleep session duration exceeding a first time threshold, wherein the alternate route provides a longer route that requires more travel time than the predetermined route, providing navigational assistance to the driver for guiding the driver to follow the alternate route, and providing navigational assistance to the driver for guiding the driver to return to the predetermined route after the vehicle has followed the alternate route.

20 Claims, 3 Drawing Sheets

(56) References Cited

U.S. PATENT DOCUMENTS

2008/0077882 A1* 3/2008 Kramer ............... B60K 35/00
 715/810
2016/0109251 A1* 4/2016 Thakur ............. G01C 21/3415
 705/335

FOREIGN PATENT DOCUMENTS

| TW | I373604 | | 10/2012 |
|---|---|---|---|
| TW | I385409 | B1 | 2/2013 |
| TW | 201333428 | A1 | 8/2013 |
| TW | I431249 | | 3/2014 |
| TW | I437210 | B | 5/2014 |
| TW | I449880 | B | 8/2014 |

OTHER PUBLICATIONS

H.J. Dikkers, Facial Recognition System for Driver Vigilance Monitoring, 2004.

* cited by examiner

METHOD OF ADJUSTING A NAVIGATION ROUTE BASED ON DETECTED PASSENGER SLEEP DATA AND RELATED SYSTEM

BACKGROUND OF THE INVENTION

1. Field of the Invention

The invention relates to a navigation device, and more particularly, to a navigation device that adjusts a navigation route when detecting that a passenger has fallen asleep.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken. The navigation devices can either be personal navigation devices such as GPS devices or mobile phones that contain the functionality of GPS receivers and navigation software.

When a passenger rides in a vehicle, it is very common for the passenger to fall asleep due to the relaxed state that the passenger enters due to sitting still for a long period of time in the vehicle and due to the motion of the vehicle as the vehicle travels over roads. Often times, the driver of the vehicle may wish to let the sleeping passenger continue to sleep rather than take a chance on the passenger waking up earlier than necessary. In situations like these, the driver may wish to travel on a longer route that is more conducive to letting the passenger continue to sleep rather than traveling on the quickest route that may not be as conducive to letting the passenger sleep. For example, if a parent of an infant is driving a vehicle with the infant as a passenger, the parent may want to let the infant continue to sleep longer rather than waking the infant up earlier than necessary.

Unfortunately, most of the time navigation devices will guide drivers to travel on the quickest route to reach a destination. While the quickest route is usually what most drivers wish to follow, drivers traveling with a sleeping passenger may be willing to delay their arrival at the destination if a longer, and at the same time, smoother and quieter route more conducive to sleeping can be followed instead of the quickest route. Currently drivers must think of and navigate to the longer, smoother, and quieter route on their own, and the navigation device is not able to help drivers conveniently find alternate routes when a passenger is sleeping.

SUMMARY OF THE INVENTION

It is therefore one of the primary objectives of the claimed invention to provide a method of adjusting a navigation route based on detected passenger sleep data.

According to an exemplary embodiment of the claimed invention, a method of adjusting a navigation route based on detected passenger sleep data is disclosed. The method includes generating a predetermined route with a navigation device installed in a vehicle, providing navigational assistance to a driver of the vehicle for guiding the driver to follow the predetermined route, receiving sleep indicators for a passenger traveling in the vehicle, the sleep indicators indicating whether the passenger is sleeping, calculating a sleep session duration for the passenger according to the sleep indicators, generating with the navigation device an alternate route in response to the sleep session duration exceeding a first time threshold, wherein the alternate route provides a longer route that requires more travel time than the predetermined route, providing navigational assistance to the driver for guiding the driver to follow the alternate route, and providing navigational assistance to the driver for guiding the driver to return to the predetermined route after the vehicle has followed the alternate route.

According to another exemplary embodiment of the claimed invention, a system for adjusting a navigation route based on detected passenger sleep data is disclosed. The system includes a sleep monitoring device generating sleep indicators for a passenger traveling in a vehicle, the sleep indicators indicating whether the passenger is sleeping, and a navigation device. The navigation device comprises a processor calculating a sleep session duration for the passenger according to the sleep indicators received from the sleep monitoring device, and a non-transitory computer readable medium comprising code executable by the processor. When executed, the code comprises the steps of generating a predetermined route and providing navigational assistance to a driver of the vehicle for guiding the driver to follow the predetermined route, generating an alternate route in response to the sleep session duration exceeding a first time threshold, wherein the alternate route provides a longer route that requires more travel time than the predetermined route, providing navigational assistance to the driver for guiding the driver to follow the alternate route, and providing navigational assistance to the driver for guiding the driver to return to the predetermined route after the vehicle has followed the alternate route.

It is an advantage that the navigation device automatically receives sleep indicators from the sleep monitoring device for indicating whether a passenger traveling in the vehicle is sleeping. When the passenger is sleeping, the vehicle can be guided to an alternate route that prioritizes a longer route that is also preferably smoother and quieter rather than arriving at a destination in the shortest amount of time. In this way, the sleeping passenger can continue to sleep. Later, if the passenger wakes up or if the passenger has slept long enough, the vehicle can be guided away from the alternate route and back to the original predetermined route.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
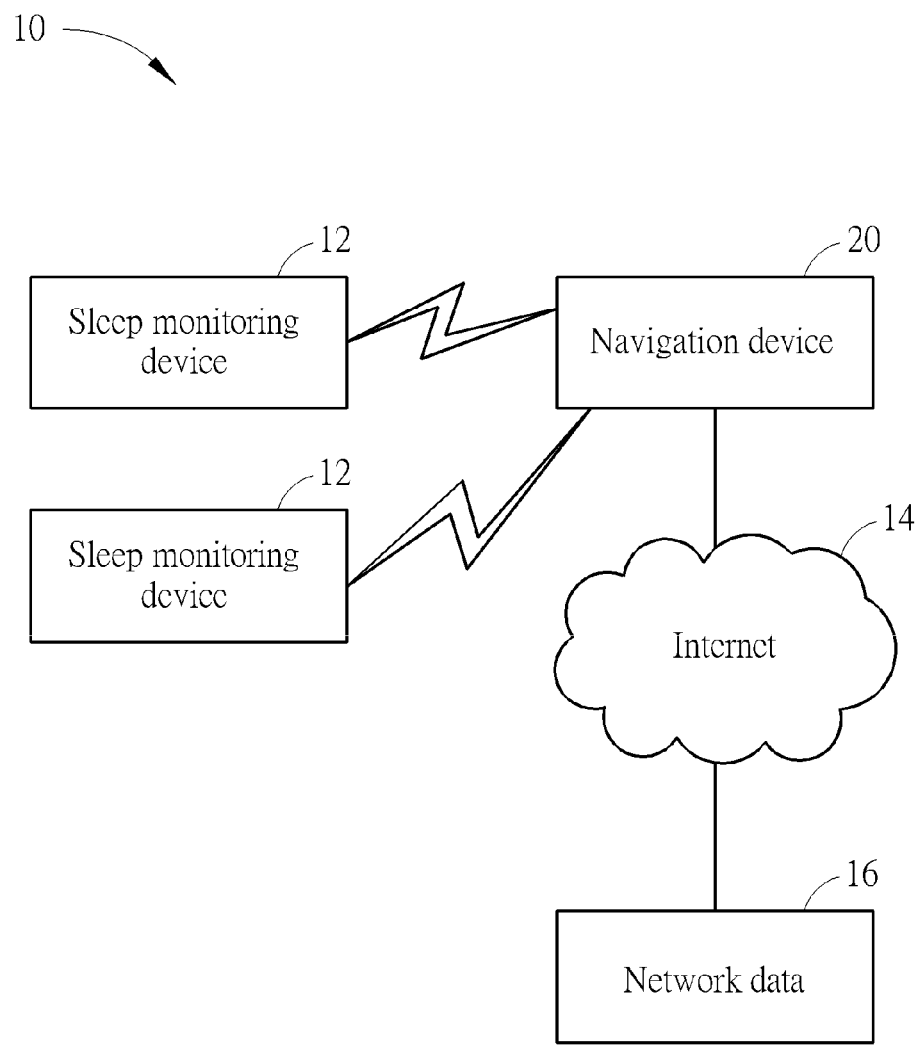
FIG. 1 is a block diagram of a system for adjusting a navigation route based on detected passenger sleep data according to the present invention.

Please refer to FIG. 1. FIG. 1 is a block diagram of a system 10 for adjusting a navigation route based on detected passenger sleep data according to the present invention. The system 10 comprises one or more than one sleep monitoring device 12. The sleep monitoring device 12 generates sleep indicators for one or more passengers traveling in a vehicle. Each passenger can have his or her own sleep monitoring device 12 or a plurality of sleep monitoring devices 12 that monitors sleep activity of that passenger. For simplicity, the following description will describe one passenger wearing the sleep monitoring devices 12, although the present invention can apply to any number of passengers whose sleep activity is being monitored. Examples of the sleep monitoring device 12 include a fitness band that detects movement of the passenger, and a camera that detects facial movement and facial expressions of the passenger. One or both of these different types of sleep monitoring devices 12 can be used to determine if the passenger has moved lately, and if the passenger is likely to be asleep. Other sleep monitoring devices 12 besides fitness bands and cameras may also be used so long as they give an indication of whether the passenger is likely to be asleep.

The system 10 also comprises a navigation device 20 for guiding a driver of the vehicle to destinations by providing navigation instructions to the destinations. The navigation device 20 is able to receive network data 16 through the internet 14. The network data 16 provides information related to road conditions and road characteristics. For instance the network data 16 can indicate how much traffic different roads currently have. In this disclosure, the term "roads" can refer to any street, avenue, boulevard, highway, freeway, etc., and is not intended to limit the type of road being taken. The network data 16 can also indicate how much noise there is on different roads. The network data 16 also indicates the total elevation change that road segments contain, as well as the highest elevation associated with a road segment. The network data 16 can also indicate speed limits along road segments. Other types of data can also be provided by the network data 16 as well.

In general, the network data 16 is used to provide an idea of how quiet and smooth a given road will be. As will be explained below, when the system 10 detects that a passenger is sleeping, a longer and preferably smoother and quieter route is selected when necessary so that the passenger may continue to sleep. The longer route allows the sleeping passenger to have more time to sleep. When selecting the longer route, a smooth and quiet route should be chosen if possible. The amount of traffic a road has will give a good indication of how smooth the drive will be on that road. For example, if there is more traffic on a road, then more sudden stops may be necessary, and the driver will have a harder time maintaining a steady driving speed. More noise on a road can make it difficult for sleeping passengers to continue sleeping. Elevation changes on a road segment or the highest elevation associated with a road segment can also give an indication of how smooth a road will be. In general, roads that have more hills or that travel through higher mountains are not as smooth for driving on as roads with fewer hills and roads that are located at lower elevations. Hilly roads require more travelling over sharp rises, drops, and turns, which makes it harder for passengers to continue sleeping. Speed limits can indicate how large a road is, and can also offer an indication as to how much stopping might be expected when traveling on that road. Traffic data and speed limit data may be provided by the Traffic Message Channel (TMC) if the TMC is received by the navigation device 20 or through the wireless transceiver 26 of the navigation device 20. In general, routes having less traffic will tend to be quieter and smoother than routes having more traffic.

Figure 2:
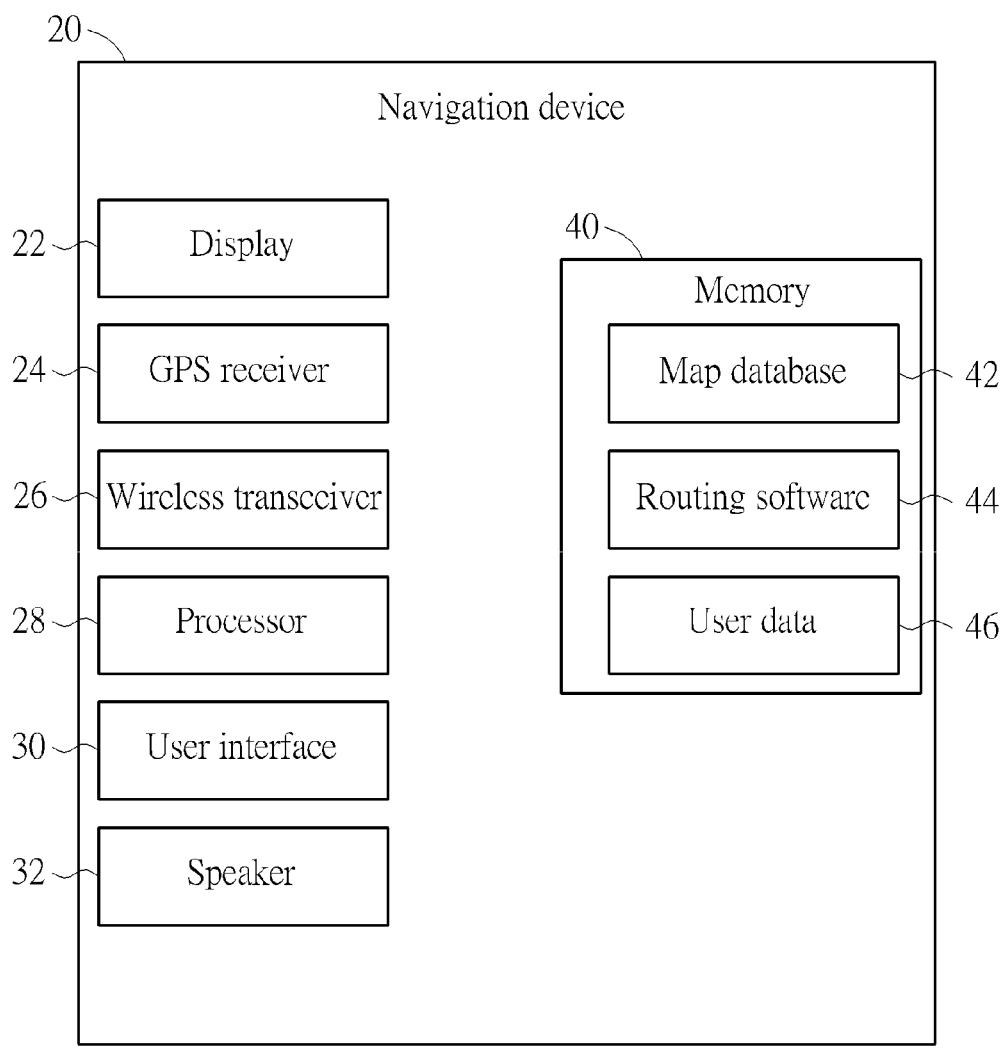
FIG. 2 is a block diagram of a navigation device according to the present invention.

Please refer to FIG. 2. FIG. 2 is a block diagram of the navigation device 20 according to the present invention. The navigation device 20 contains a display 22 which can be a touch sensitive display, a GPS receiver 24 for receiving the current coordinates of the navigation device 20, and a wireless transceiver 26 such as a Wireless Fidelity (Wi-Fi) transceiver or a mobile internet transceiver such as a third generation of mobile telecommunications technology (3G) transceiver or a fourth generation of mobile telecommunications technology (4G) transceiver for allowing the navigation device 20 to receive network data 16 via the internet 14. The navigation device 20 also comprises a processor 28 for controlling operation of the navigation device 20 and executing code for operating the navigation device 20, a user interface 30, a speaker 32, and memory 40. The memory 40 may be non-volatile memory such as flash memory, and is used to store a map database 42 containing map data and points of interest. The memory 40 also stores routing software 44 as well as any user data 46 that the user wishes to store. The user data may indicate things such as what times of day the passenger usually takes a nap, how long the passenger should be allowed to sleep during certain times of day, and how long the passenger has already slept in recent hours. This user data 46 may be manually entered by users of the navigation device 20 or may be automatically received from one or more of the sleep monitoring devices 12 such as a fitness band. The routing software 44 is executed by the processor 28, and provides navigational guidance to destinations.

Please note that the "driver" referred to in this disclosure can be either a human driver or computer driver in a driverless vehicle. The "passenger" can refer to anyone traveling in the vehicle who is not needed as the driver. Relevant laws will determine who is considered to be a driver for driverless vehicles, but the present invention is interested in helping passengers continue to sleep longer when possible. Of course, drivers that need to operate the vehicle should not be allowed to sleep while driving. Optionally, the sleep monitoring devices 12 can be used to trigger an alert to wake up a sleeping driver when detecting that the driver may be sleeping.

Figure 3:
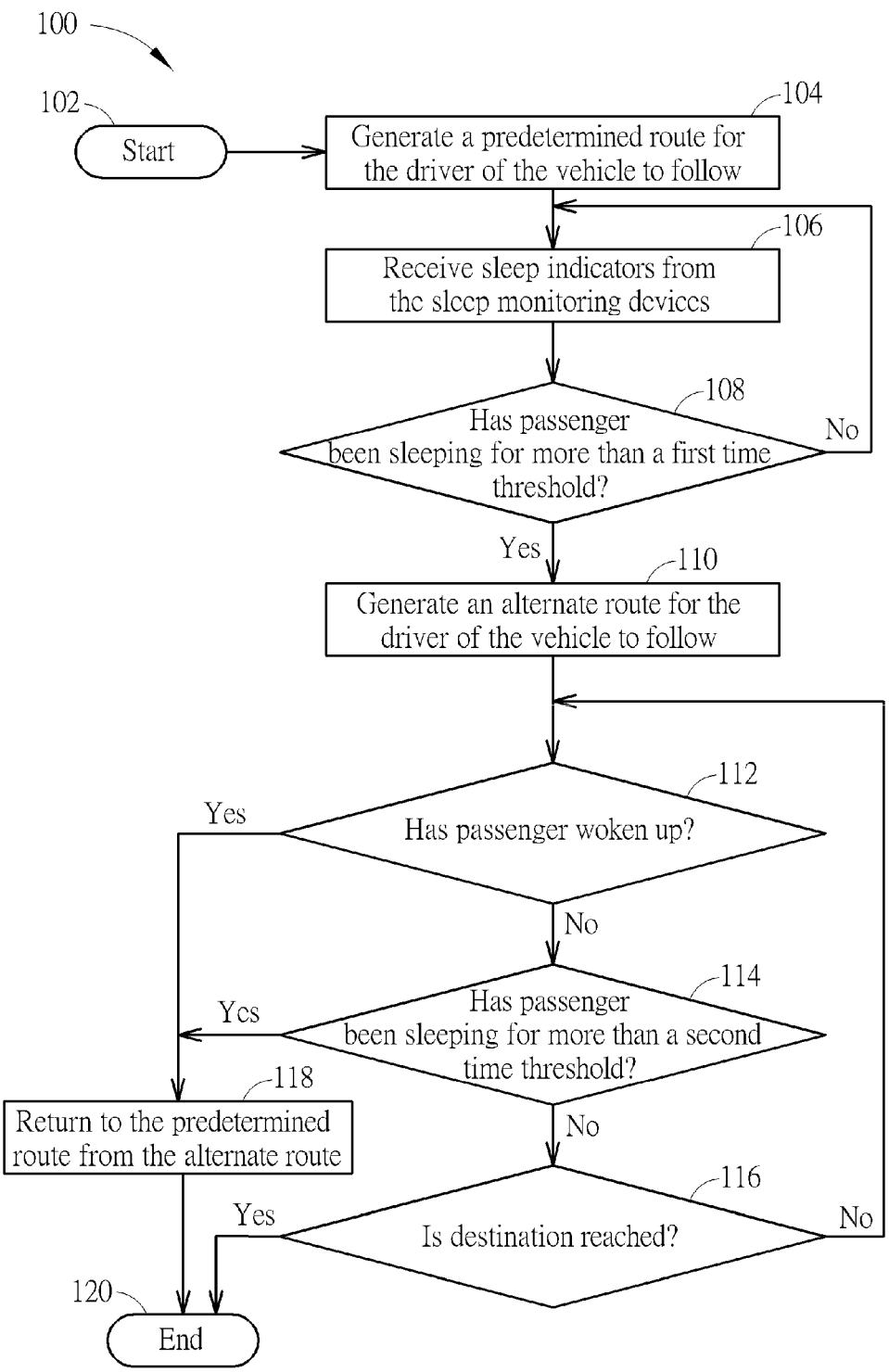
FIG. 3 is a flowchart illustrating a method of adjusting a navigation route with the navigation device based on detected passenger sleep data according to the present invention.

Please refer to FIG. 3. FIG. 3 is a flowchart 100 illustrating a method of adjusting a navigation route with the navigation device 20 based on detected passenger sleep data according to the present invention. Steps contained in the flowchart 100 will be explained below.

Step 102: Start.

Step 104: Generate a predetermined route for the driver of the vehicle to follow. The predetermined route is the route that is normally chosen by the routing software 44 of the navigation device 20 to reach a destination. The predetermined route typically strives to allow the vehicle to arrive at the destination in the shortest amount of time possible. Provide navigational assistance to guide the driver on the predetermined route.

Step 106: Receive sleep indicators from the sleep monitoring devices 12. The sleep indicators will indicate whether the passenger is sleeping or is likely sleeping. The sleep indicators can be received at fixed time intervals such as every 15 seconds or every minute, or the sleep indicators can be received only when sleep activity is detected by the sleep monitoring devices 12.

Step 108: Determine whether the passenger has been sleeping for a duration exceeding a first time threshold. When sleep indicators indicate that the passenger is sleeping, a sleep session duration of the passenger is calculated. When this sleep session duration exceeds the first time threshold, step 110 is executed. When this first time threshold has not been exceeded, step 106 is repeated. An example of the first time threshold can be a value such as three minutes or five minutes, and the first time threshold should ideally be high enough to give a reasonably confident assessment that the passenger is actually asleep.

Step 110: Generate an alternate route for the driver of the vehicle to follow. The alternate route is selected to provide a longer for the sleeping passenger as compared to the predetermined route. Whenever possible, the alternate route should also be smooth and quiet to allow optimum sleeping conditions. The alternate route is created with the routing software 44 while considering data from the map database 42, the user's preferences stored in the user data 46, and the network data 16. Provide navigational assistance to guide the driver on the alternate route.

Step 112: Determine if the sleeping passenger has woken up. If so, go to step 118. If not, go to step 114.

Step 114: Determine if the passenger has slept more than a second time threshold. When the sleep session duration exceeds the second time threshold, the sleeping passenger has had enough sleep, and step 118 is executed. When the sleep session duration has not exceeded the second time threshold, the passenger may continue sleeping, and step 116 is executed. This second time threshold is preferably obtained from the user data 46, and the second time threshold specifies how long the passenger should be allowed to sleep. This second time threshold may depend on what time of day it is, and how much time the passenger has already slept that day or during recent hours.

Step 116: Determined if the destination is reached. If so, go to step 120. If not, go back to step 112.

Step 118: Return to the predetermined route after traveling on the alternate route. Since the passenger does not need to sleep any longer, the original predetermined route can be taken instead of the alternate route. The routing software 44 will guide the driver back to the predetermined route, when possible, in order to continue on to the destination in the shortest amount of time.

Step 120: End.

Please note that the navigation device 20 may be a traditional GPS device for helping drivers to navigate to a destination, may be a mobile phone that has a GPS receiver and routing software in the mobile phone, or may be any other device that can offer routing assistance while at the same time interfacing with the sleep monitoring devices 12. The network data 16 may not strictly be necessary for the navigation device 20 to select the alternate route since the map database 42 can also be used to generate the alternate route. However, the network data 16 can be used for making better choices when comparing candidate alternate routes with the predetermined route that the vehicle is already traveling on. Also, network data 16 can be downloaded to the navigation device 20 in advance so that a constant connection between the navigation device 20 and the internet 14 is not necessary.

In summary, the navigation device 20 is able to automatically receive sleep indicators from the sleep monitoring devices 12 for indicating whether a passenger traveling in the vehicle is sleeping. When the passenger is sleeping, the vehicle can be guided to an alternate route that prioritizes a longer ride rather than arriving at a destination in the shortest amount of time on the predetermined route. In this way, the sleeping passenger can continue to sleep. The alternate route should preferably be smooth and quiet too. Later, if the passenger wakes up or if the passenger has slept long enough, the vehicle can be guided away from the alternate route and back to the original predetermined route. The present invention provides an easy and convenient way for parents to monitor their children's sleep patterns, and to allow the children to sleep longer when traveling in the vehicle when the children need more sleep. Not only can the alternate route provide a longer, smoother, and quieter route than the predetermined route, but the alternate route can also delay the vehicle's arrival at the destination, thereby providing sleeping passengers with more time to sleep.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of adjusting a navigation route based on detected passenger sleep data, the method comprising: generating a predetermined route with a navigation device installed in a vehicle; providing navigational assistance to a driver of the vehicle with the navigation device for guiding the driver to follow the predetermined route; receiving sleep indicators for a passenger traveling in the vehicle from a sleep monitoring device, the sleep indicators indicating whether the passenger is sleeping; calculating a sleep session duration for the passenger with a processor of the navigation device according to the sleep indicators; generating with the navigation device an alternate route in response to the sleep session duration exceeding a first time threshold, wherein the alternate route provides a longer route that requires more travel time than the predetermined route; providing navigational assistance to the driver with the navigation device for guiding the driver to follow the alternate route; and providing navigational assistance to the driver with the navigation device for guiding the driver to return to the predetermined route after the vehicle has followed the alternate route.

2. The method of claim 1, wherein providing navigational assistance to the driver for guiding the driver to return to the predetermined route after the vehicle has followed the alternate route comprises guiding the driver to return to the predetermined route after detecting the passenger has woken up.

3. The method of claim 1, wherein providing navigational assistance to the driver for guiding the driver to return to the predetermined route after the vehicle has followed the alternate route comprises guiding the driver to return to the predetermined route before detecting the passenger has woken up, but after the sleep session duration has exceeded a second time threshold.

4. The method of claim 1, wherein the sleep indicators detect whether the passenger is moving.

5. The method of claim 1, wherein the sleep indicators detect the passenger's facial expressions.

6. The method of claim 1, wherein the sleep indicators are received at fixed time intervals.

7. The method of claim 1, wherein the alternate route is generated such that the alternate route has less traffic than the predetermined route.

8. The method of claim 1, wherein the alternate route is generated such that the alternate route has less noise than the predetermined route.

9. The method of claim 1, wherein the alternate route is generated such that the alternate route has a lower elevation change than the predetermined route.

10. The method of claim 1, wherein the alternate route is generated such that the alternate route has a lower speed limit than the predetermined route.

11. A system for adjusting a navigation route based on detected passenger sleep data, the system comprising:
a sleep monitoring device generating sleep indicators for a passenger traveling in a vehicle, the sleep indicators indicating whether the passenger is sleeping;
a navigation device, comprising:
a processor calculating a sleep session duration for the passenger according to the sleep indicators received from the sleep monitoring device; and
a non-transitory computer readable medium comprising code executable by the processor, wherein when executed the code comprises the following steps:
generating a predetermined route and providing navigational assistance to a driver of the vehicle for guiding the driver to follow the predetermined route;
generating an alternate route in response to the sleep session duration exceeding a first time threshold, wherein the alternate route provides a longer route that requires more travel time than the predetermined route;
providing navigational assistance to the driver for guiding the driver to follow the alternate route; and
providing navigational assistance to the driver for guiding the driver to return to the predetermined route after the vehicle has followed the alternate route.

12. The system of claim 11, wherein providing navigational assistance to the driver for guiding the driver to return to the predetermined route after the vehicle has followed the alternate route comprises guiding the driver to return to the predetermined route after detecting the passenger has woken up.

13. The system of claim 11, wherein providing navigational assistance to the driver for guiding the driver to return to the predetermined route after the vehicle has followed the alternate route comprises guiding the driver to return to the predetermined route before detecting the passenger has woken up, but after the sleep session duration has exceeded a second time threshold.

14. The system of claim 11, wherein the sleep indicators received from the sleep monitoring device detect whether the passenger is moving.

15. The system of claim 11, wherein the sleep indicators received from the sleep monitoring device detect the passenger's facial expressions.

16. The system of claim 11, wherein the sleep indicators are received by the navigation device from the sleep monitoring device at fixed time intervals.

17. The system of claim 11, wherein the alternate route is generated such that the alternate route has less traffic than the predetermined route.

18. The system of claim 11, wherein the alternate route is generated such that the alternate route has less noise than the predetermined route.

19. The system of claim 11, wherein the alternate route is generated such that the alternate route has a lower elevation change than the predetermined route.

20. The system of claim 11, wherein the alternate route is generated such that the alternate route has a lower speed limit than the predetermined route.

* * * * *